A. AGNEW & W. MORRISON.
CORN AND OTHER CULTIVATORS.
No. 29,043.  Patented July 10, 1860.
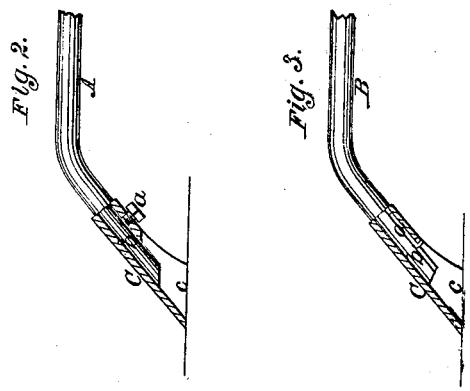
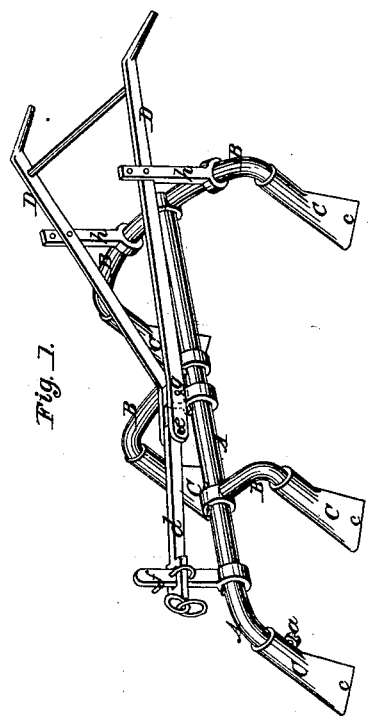

UNITED STATES PATENT OFFICE.

ALLAN AGNEW, OF CHESTER COUNTY, AND WM. MORRISON, OF CHADD'S FORD, PENNSYLVANIA.

IMPROVEMENT IN CULTIVATORS.

Specification forming part of Letters Patent No. 29,043, dated July 10, 1860.

*To all whom it may concern:*

Be it known that we, ALLAN AGNEW, of the county of Chester, and WILLIAM MORRISON, of Chadd's Ford, in the county of Delaware, both in the State of Pennsylvania, have made certain new and useful Improvements in Corn and other Cultivators; and we do hereby declare the following to be a full, clear, and exact description of the construction and operation of the same, reference being had to the accompanying drawings, making a part of this specification, in which—

Figure 1 represents a perspective view of the cultivator complete. Figs. 2 and 3 represent sections through the cultivator-teeth to show how they may be secured to the frame.

Our invention consists mainly in the shape of the teeth and the manner of hanging them to the frame, so that the soil will freely rise up and fall behind them without clogging, and so that the teeth may be let down on the frame or its branches as they are worn away by use.

To enable others skilled in the art to make and use our invention, we will proceed to describe the same with reference to the drawings.

For the frame we prefer to use round iron. It is composed of one main stem, A, and a series of branches, B, which may be so connected with the main stem as to be adjustable thereon, but when adjusted rigid therewith. The point of the stem A is bent forward and downward and receives upon it one of the teeth or shoes C, it being held thereto by a set-screw, *a*, or by a key or pin, as may be preferred. The point of the stem, as shown in Figs. 2 and 3, forms a tang, *b*, which fits into the socket in the head of the tooth, and the inclination and shape of the tooth is such that even in damp or sticky soils the earth will not clog on the tooth.

The branches B may project both sides of the stem, and their points are similarly bent forward and downward as that of the stem above mentioned, and receive and hold and admit of adjustment thereon, as in the above-described case of the point, leaving no part of the frame or other incumbrance over them that would tend to check the passing over of the soil or raise the cultivator up out of the ground. The sole *c* of the teeth sits squarely on the ground from point to heel, which causes the cultivator to run smoothly and hold itself up to the rows of plants on slanting ground without creeping away from the rows.

The teeth may be made of iron or steel, or parts of each.

*d* is the drag-bar, pivoted at *e* and passing through or over a guide-stem, *f*, to regulate the depth that the teeth shall enter the ground.

D D are the handles. They may be pivoted at *g*, and, extending backward in contact with the standards *h h*, be adjusted thereto to suit the height of the user.

The entire cultivator may be of metal, is cheap, strong, and very efficient for its purpose.

Having thus fully described our invention, what we claim as new, and desire to secure by Letters Patent, is—

A cultivator composed of a stem and branches and teeth projecting from ends thereof, and secured and made adjustable thereon, as set forth, the whole being constructed and arranged substantially in the manner and for the purposes herein described and represented.

ALLAN AGNEW.
WILLIAM MORRISON.

Witnesses:
A. B. STOUGHTON,
EMMA C. JEFFERIS.